United States Patent

Naccache

[11] Patent Number: 5,910,989
[45] Date of Patent: Jun. 8, 1999

[54] METHOD FOR THE GENERATION OF ELECTRONIC SIGNATURES, IN PARTICULAR FOR SMART CARDS

[75] Inventor: David Naccache, Paris, France

[73] Assignee: Gemplus, Gemenos, France

[21] Appl. No.: 08/765,483

[22] PCT Filed: Apr. 22, 1996

[86] PCT No.: PCT/FR96/00612

§ 371 Date: Mar. 6, 1997

§ 102(e) Date: Mar. 6, 1997

[87] PCT Pub. No.: WO96/33567

PCT Pub. Date: Oct. 24, 1996

[30] Foreign Application Priority Data

Apr. 20, 1995 [FR] France ................................ 95 04753
Jun. 27, 1995 [FR] France ................................ 95 07668

[51] Int. Cl.$^6$ ................................ H04L 9/00; H04L 9/06; H04L 9/30
[52] U.S. Cl. ................................ 380/25; 380/23; 380/29; 380/30; 380/49
[58] Field of Search ................................ 380/23, 24, 25, 380/29, 30, 49, 9, 50, 59, 28

[56] References Cited

U.S. PATENT DOCUMENTS 4,710,613 12/1987 Shigenaga ................................ 380/25 X
5,231,668 7/1993 Kravitz ................................ 380/28
5,625,695 4/1997 M'Raihi et al. ................................ 380/28

FOREIGN PATENT DOCUMENTS

A-186038 7/1986 European Pat. Off. .

OTHER PUBLICATIONS

Byte, vol. 18, No. 12, Nov. 1993, *Digital Signatures*, Bruce Schneier, pp. 309–312.
Journal of Cryptology, vol. 4, No. 3, 1991, *Efficient Signature Generation by Smart Cards*, C.P. Schnorr, pp. 161–174.

*Primary Examiner*—Bernarr E. Gregory
*Attorney, Agent, or Firm*—Nilles & Nilles, S.C.

[57] ABSTRACT

Processes for generating digital signatures for electronic messages. Modifying signature-generating algorithms, such as DSAs (Digital Signature Algorithms), in order to enable smart cards with reduced calculation and storage resources to produce digital signatures with a high degree of security in spite of their reduced resources. The signature-checking terminal sends a random number a and measures the time taken by the card to send back a signal s using this random number. If the time is greater than a given duration, the signature is rejected even if the check of its authenticity is positive. In addition, part of the signature (the part which does not use the secret card key but only the public algorithm parameters) is precalculated and stored in the card in the form of signature portions produced by a compression function such that they are short. Only the second part of the signature has to be calculated by the card. The calculations to be made are simple so that the card does not require extensive calculation and memory resources.

20 Claims, 2 Drawing Sheets

METHOD FOR THE GENERATION OF ELECTRONIC SIGNATURES, IN PARTICULAR FOR SMART CARDS

BACKGROUND OF THE INVENTION

1. Field of the Invention

The invention relates to a method for the generation of digital signatures for electronic messages.

The method can be applied especially to the signing of messages by portable devices of the microprocessor-based smart card type.

For example, it may be necessary to sign messages sent by the card to a reading terminal or to a central authority. Or again, it may be necessary to carry out a transaction (an electronic cheque transaction) and to sign this transaction so that it can be authenticated first of all by the reading terminal in which the transaction is made and then by a central authority that manages the transaction.

The method that shall be described is related to the algorithms for the generation of digital signatures published in recent years, especially by the U.S. National Institute of Standards and Technology, for example the DSA (Digital Signature Algorithm) described in the U.S. patent application Ser. No. 07/736451 filed Jul. 26, 1991 and now U.S. Pat. No. 5,231,668 and published on the 30the of Aug. 1991 in the Federal Register kept by this Institute, pages 42980–42982.

The invention is aimed at modifying the known methods, in particular to make them adaptable to microprocessor-based cards that do not have physical resources (processor, memories) sufficient to swiftly carry out mathematical operations on big numbers. The known algorithms, especially the DSA, use big numbers to generate signatures with a sufficient degree of security.

2. Description of the Related Art

In order to provide for a clear understanding of the invention, first of all a reminder shall be given of what is the DSA algorithm.

A DSA signature consists of a pair $\{r, s\}$ of big numbers represented in computers by long strings of binary digits (160 digits). The digital signature is computed by means of a series of computation rules defined by the algorithm and a set of parameters used in these computations. The signature enables both the certifying of the identity of the signer (because it brings into action a secret key proper to the signer) and the integrity of the signed message (because it brings into action the message itself). The algorithm makes it possible firstly to generate signatures and secondly to check signatures.

The generation of DSA signatures brings into action a secret key. The check brings into action a public key that corresponds to the secret key but is not identical to it. Each user has a pair of keys (secret, public). The public keys may be known to all while the secret keys are never revealed. Anybody has the capacity to check the signature of a user by using the public key of this user but only the possessor of the secret key can generate a signature corresponding to the pair of keys.

The parameters of the DSA are the following:

a prime number p such that $2^{L-1} < p\ 2^L$ for L ranging from 512 to 1024 (including the limits) and L=64a for a as any integer;

a prime number q such that $2^{159} < q\ 2^{160}$ and p-1 is a multiple of q;

a number g, q order modulo p, such that:
   $g = h^{(p-1)/q}$ modulo p where h is any integer checking $1 < h < p-1$ and $g > 1$;

a randomly or pseudo-randomly generated number x (this is the secret key, fixed for a given user);

a number y defined by the relationship
   $y = g^x$ modulo p; (this is the public key linked to the secret key); the modular operations defined here below, modulo p or modulo q, shall be designated by mod p or mod q respectively;

a randomly or pseudo-randomly generated number k such that $0 < k < q$.

The integers p, q and g are parameters of the system that can be published and/or shared by a group of users. The secret and public keys of a signer are respectively x and y. The parameter k which is a random parameter must be regenerated for each new signature. The parameters x and k are used for the generation of signatures and must be kept secret.

In order to sign a message m (which will generally be a hashed value of an initial file M), the signer computes the signature $\{r, s\}$ by:

$r = (g^k \bmod p) \bmod q$, and $s = (m + xr)/k \bmod q$ (where the division by k is taken to be modulo q, namely that 1/k is the number k' such that $kk' = 1 \bmod q$; for example if q=5 and k=3, then 1/k=2 for 3×2=6, giving 1 mod 5).

After the fact that r and s are different from zero has been tested, the signature $\{r, s\}$ is sent to the verifier. The verifier is generally the terminal into which the smart card that sends the message m and the signature $\{r, s\}$ is inserted.

The verifier, which knows p, q, g (related to the application), y (related to the user) and m (the message that he has received from the card), computes:

a. $w = (1/s) \bmod q$ b. $u1 = mw \bmod q$ c. $u2 = rw \bmod q$ d. $v = [g^{u1} \cdot y^{u2} \bmod p] \bmod q$ Now, this value $[g^{u1} \cdot y^{u2} \bmod p] \bmod q$ is precisely equal to r if s has the value $(m+xr)/s \bmod q$.

Consequently, the terminal receives r and s and ascertains that v is really equal to r to accept the signature or reject it otherwise.

Hereinafter, the term "signer" or signer unit or proving device or smart card shall be used without distinction to designate the device that sends out the signature and that will generally be a smart card. And the term "verifier" or verifier unit or verifier device or verifier terminal or again control authority shall be used without distinction to designate the device that receives the signature and checks it to accept or reject a transaction or a message. The simplest application of the invention is the sending of the signature by means of a smart card to a reading terminal into which the card is inserted, with the terminal performing the checking function and being connected or not connected to a central management authority.

SUMMARY OF THE INVENTION

One of the aims of the present invention is to increase the security of generation and checking of digital electronic signatures, in minimizing the computation and memory means that have to be present in the smart card to produce the signatures.

It would be particularly desirable to be able to use low-cost 8-bit microprocessors in the card rather than more powerful and costlier microprocessors, despite the fact that the 8-bit microprocessors cannot easily process big numbers. However this should not be done to the detriment of security.

According to a first major aspect, the invention proposes that the checking by a verifier (terminal) of the signature sent by the signer (card) uses a step for the timing of the period of time that elapses between an instant when a data element (in principle a random data element) is sent by the verifier to the signer (the card) and the instant when the signature (using this random data element) returns to the verifier. If the time that has elapsed is excessively lengthy, it means that the computational processing of the signature by the signer has been done abnormally and the signature is rejected even if its authenticity is confirmed by the verifier.

Indirectly, this approach makes it possible, as shall be seen, to preserve the same security of signature while at the same time using small physical resources (in terms of computation power and memories) in the smart card. Small resources entail the need to modify the methods of generation and checking of signatures, but this is to the detriment of security. The timing step according to the invention restores a sufficient level of security.

This approach shall be described in detail on the basis of algorithms derived from the DSA algorithm recalled here above, but it will be understood that this first aspect of the invention is applicable with other algorithms even if they are very different from the DSA algorithm.

In brief, the first aspect of the invention consists of an electronic signature method, comprising the generation of a digital signature by a signer unit that computes this signature by using a random data element sent by a verifier unit, and the checking of the signature by the verifier which ascertains that a mathematical condition, bringing into action the signature sent and the random data element, is fulfilled, this method being characterized in that the checking of the signature sent by the signer to the verifier further uses a step for the timing of the period that elapses between an instant when the random data element is sent by the verifier to the signer and the instant when the signature using this data element returns to the verifier after computation by the signer, the signature being accepted if the time elapsed is below a defined threshold and if the mathematical condition is verified.

Preferably, the algorithm used is of the type in which the signature generation produces two values $\{r, s\}$, s being computed from r and a secret key x, and in which the checking of the signature $\{r, s\}$ consists of the checking of an equality $v=f(r, s)=r$ between r and a function f of r and of s. It is then provided according to the invention that the function f will be chosen to be sufficiently complex so that the period of the search for a value s on the basis of this equality when there is no knowledge of the secret key is far greater, even if it is performed by a powerful computer, than the period of computation and transmission by the card of the value s on the basis of r and of the secret key, this being the case even if the card uses a low-power microprocessor (a 20 MHz 8-bit microprocessor for example). Thus, by making an accurate choice of the time condition introduced by the timing, it is seen to it that this condition cannot be fulfilled when there is no knowledge of the secret key, and especially that it cannot be fulfilled by a search for s on the basis of the equality $r=f(r, s)$.

In practice, the function $f(r, s)$ also brings into action a message m to be signed so that it can be referenced $f(r, s, m)$.

Preferably, the function f comprises mathematical computations followed by a complex hash function. The first part of the signature r is established by other mathematical computations followed by the same complex hash function.

This complex hash function is preferably, as shall be explained further below, a complex compression function leading to a reduction of the length of the bit strings obtained by the mathematical computations performed.

It may be recalled that a hash function is a function of logic processing of binary strings that can be used to obtain a string of characters of determined length on the basis of another string of characters of the same length or of a different length. A complex hash function may be obtained by successive operations of hashing and/or mathematical computations implying the results of several hashing operations. A compression may be obtained at the end by taking, as the result, a modular value modulo $2^e$ where e is the length of the string finally desired.

Furthermore, according to another major aspect of the invention, there is proposed a novel approach for the processing of the smallest numbers in the smart card, in digital signing algorithms of the type in which the signing brings into action two numbers, r and s, only the number s bringing into action the secret key of the card and the message to be sent.

This second aspect of the invention is an improvement to a method for the generation of signatures that has been described in the French patent application 93 14466. In this patent application, it is explained that, in an algorithm of this type (DSA is an example thereof), the number r depends neither on the message m sent by the card nor on the secret key contained in the card. It depends only on numbers that are unchanging for the application considered and on random numbers; for example these numbers are g, p, q and k in the DSA algorithm. It is therefore unnecessary to obtain a computation of r by the card, for this takes up a substantial amount of computation time. Rather, a certified central authority is made to carry out a computation in advance of a series of n possible values r, referenced $r_i$, i being an index ranging from 1 to n. The values $r_i$ are stored in the card. At each new use of the card, one of the values $r_i$ is used (and this value will no longer be used at the following times). At the time of signing, the card computes only the other part of the signature s on the basis of a value $r_i$ and the secret key x of the message m, and the verifier is then sent the message m and the pair $\{r_i, s\}$ representing the signature that the verifier can then make the check in the manner laid down by the algorithm considered.

The numbers $r_i$ are precomputed certificates, also called "signature coupons". They form a part only of the signature to be sent and they may be prepared and stored in advance in the card. The index i represents the index of the coupon used during a given signature.

However, one of the difficulties lies in the great length of these coupons (160 bits in the DSA algorithm represented here above). They use up a substantial degree of non-volatile memory space in the card. It is not possible to save a large number of them in the card if a limited size of non-volatile memory is available. Furthermore, they entail a very lengthy computation time with an 8-bit microprocessor because it is necessary to search for these numbers in small pieces. However, if smaller signature coupons were to be used and stored, there would be the risk of the guarantee of authenticity of signature being far lower.

The invention described here makes it possible to reconcile the need for a guarantee of authenticity with the use of smaller signature coupons $r_i$.

The invention therefore proposes a method for the generation of electronic signatures by a signer unit and for checking by a verifier unit, using a digital signature algorithm in which the signature sent by the signer comprises at least one signature coupon $r_i$ and one signature complement s that is computed on the basis of the coupon $r_i$ and of a secret key x of the card, this algorithm enabling the checking of a signature by a verifier by means of a checking formula of the following type:

$$v=f(r_i, s)=r_i$$

this method being characterized in that:
 a. the signature coupon is established in advance by a certified authority, in two steps:
    the computation of a number represented by a long binary string, by means of a mathematical formula bringing into action big binary numbers;
    and the modification of the result of this computation by a complex compression function greatly reducing the length of this result,
 b. a series of different coupons of small length are thus prepared in advance and stored in the signer unit (smart card with memory and microprocessor),
 c. the signature generation comprises the sending of a coupon $r_i$ and a signature complement s computed on the basis of at least $r_i$ and x,
 d. the signature checking algorithm comprises a mathematical computation followed by the same complex compression function as the one used to prepare the coupon, and the result is compared with the coupon for the signature check.

The compression function is preferably a complex hash function that requires a fairly lengthy computation time. This provides great security to the method of generation and checking of signatures. Hence the advantage of an efficient guarantee of authenticity of signatures is combined with the possibility of the saving in the card of only small-sized coupons, hence the possibility of saving many of them. If, in addition, the timing mentioned further above is used, it can be seen that it is possible to reinforce the guarantee of authenticity to a very high degree.

The computation of the signature s of course brings into action the message m that is to be signed in order to guarantee not only the authenticity of the signature but also the integrity of the message transmitted.

It is further possible to improve security by one or more of the following characteristics:

The formula for the computation of the coupon $r_i$ is preferably established on the basis of a random element J generated at the outset by the card and stored in the card to be reused when the coupon is be used to establish a signature.

It is possible to provide for a situation where, in order to activate the generation of a signature, the verifier terminal will send a random element a to the card and then activate the timer; it can also seen to it that the establishment of the signature complement necessarily uses this random element a and that the checking of signatures also necessitates this random factor a.

The signature complement s is preferably established by a computation bringing into action a hash function SHA(m, a) of the message and of this random factor a, the same hash function being used for the signature check.

The signature complement s is preferably established by a computation bringing into action a random element J stored in the card and having been used to establish the signature coupon. Preferably again, this computation of s brings into action a hash function SHA(x, J, i) pertaining to this random element J and to an index i representing the number of the coupon used, this same hash function having been used previously during the computation of the long binary string provided for in the computation of the corresponding coupon. This hash function preferably also brings into action the secret key x of the card.

The signature function s is preferably established by a computation bringing into action a hash function of the coupon SHA($r_i$), the same hash function SHA($r_i$) being used for the signature check.

Thus, according to a particular aspect of the invention, there is proposed a method for the generation of digital signatures of messages by a signer device and for the checking of these signatures by a verifier device, the signer device comprising means for the computation, communication and retaining of data elements comprising at least one electrically programmable non-volatile memory according to which there are prepared enciphered data elements constituting signature coupons $r_i$ that are loaded into the non-volatile memory and that are used by the signer device to sign messages, chiefly characterized in that:

the coupons are compressed by the application of a compression function, also called a hash function, by a certified authority before being loaded into the memory, and in that this method comprises the following exchanges:
 a message m is transmitted and this message must be certified by a signature,
 the signer sends a coupon $r_i$ to the verifier,
 the verifier sends a random number a to the signer and activates a timer,
 the signer computes the signature s of the message and sends it to the verifier,
 the verifier stops the timer and ascertains that the signature has been obtained through the secret held in the card and the coupon $r_i$ received; this checking is done by checking the following equality:

$$v=f(r_i, s, m)=r_i$$

the verifier accepts the signature if the condition of checking $v=r_i$ is fulfilled and if the measured time does not exceed an allocated predetermined period.

To simplify the description, hereinafter, reference shall be made above all to a card for the signer or to a signer.

BRIEF DESCRIPTION OF THE DRAWINGS

Other features and advantages of the invention shall appear from the following detailed description made with reference to the appended drawings, of which.

DETAILED DESCRIPTION OF THE PREFERRED EMBODIMENTS

From the explanations given in the introduction, it will be understood that the main advantage of the signature coupons precomputed according to the method of the invention lies in the speed of computation of a signature by a card based on a single 8-bit microcontroller and the low memory storage requirement of the stored coupons. Typically, the signature computation can be done in 300 ms approximately, including transmission time, and each coupon may use two to four EPROM or EEPROM type memory bytes.

The invention shall be described in this example, bearing in mind that it is only an example, even if it is considered herein to be the most advantageous one The method for the generation of signatures can be subdivided in this case into two distinct stages: the loading of the coupons by the authority that has delivered the card and then the use of these coupons by the card, before a terminal that does not know the secret x of the card.

The two stages herein make use of two different types of hash functions. It may be recalled that a hash function for the hashing of an number, represented by a string of bits, consists of the production of another string of bits of a specified length that may or may not be the same as the length of the initial string, this production being done on the basis of logic functions carried out on groups of bits of the initial string.

Simple hash functions are used, referenced SHA(ch) for the hashing of a string ch. These functions may be standard hash functions such as those published in the recent American standard SHA (Secure Hash Algorithm-FIPS PUB 180, dated Feb. 1, 1993, in Digital Signature Standard). These functions may be MDA or MD5 functions or a hashing operation based on the DES (Data Encryption Standard) algorithm.

Other functions, known as complex hash functions will also be used. Their characteristic used herein is not so much that of being a hash function as that of being a slowing-down function dictated during certain signal processing operations, and also that of being a compression function reducing the length of the signature coupons to be saved in the smart card.

This slowing-down and compression function is hereinafter referenced H(ch) for the processing of a string ch.

All sorts of slowing-down and compression functions could be used in the invention. For example, the following function has been taken as a function H(ch), where SHA(ch) designates a standard hash function:

$$H(ch)=SHA[SHA\{SHA(ch)\}^{SHA(ch)} \bmod p] \bmod 2^e$$

where e is the length desired for the coupons, for example 16 to 40 bits, giving some bytes.

Hereinafter, we shall take up an algorithm directly inspired by the DSA algorithm to show how the original specific features of the invention are implemented. The parameters p, q, g, x, y used are those defined here above with respect to the algorithm DSA.

LOADING OF COUPONS INTO THE CARD

This is the preliminary step but of course only when a computation is made in advance, outside the card, of the first part r of the signature {r, s} and when several possible values $r_i$ are loaded into the card.

1. The card resets a counter in the non-volatile memory (EPROM or EEPROM), generates a random element J (of 10 to 20 bytes for example) records it in the non-volatile memory and sends it to the control authority that knows the secret x of the card and that makes a computation, for i=1 to n, of several values $k_i$ and several values $r_i$:

$$k_i=\{1/(SHA(x, J, i)\} \bmod q$$

and $r_i=H(g^{ki} \bmod p)$; H is the slowing-down and compression function.

It may also be envisaged that the card will make a computation for each i of the value SHA(x, J, i) and will send it to the control authority; this authority computes the numbers $r_i$.

2. The authority sends the numbers $r_i$ to the card that stores them in memory in preserving the link with the reference i. The numbers $k_i$ are not preserved.

If we refer to the algorithm DSA, $k_i$ represents the random number k, modified at each new signature. However, instead of being put out by the verifier terminal at the time of a signature, it will be recomputed at the appropriate time by the card. Since it depends on i and since a coupon with an index i is used only once, $k_i$ is renewed each time.

THE USE OF A COUPON TO SIGN A MESSAGE

When the card seeks to sign a message, the following protocol is used after the transmission of the message m (preferably in the form of a hashed function of the true message, according to a known hash function of the terminal that receives the message):

1. The card:
   extracts the state i from the counter (representing the current index of the signature that will be produced);
   extracts, from the non-volatile memory, the random element J, the secret x, the coupon $r_i$ corresponding to the index i;
   computes I=SHA(x, J, i); this value I is none other than the modular reverse of $k_i$ used for the computation of the coupon $r_i$;
   computes A=xSHA($r_i$) mod a;
   increments i (for a future signature);
   sends $r_i$ to the verifier terminal; this dispatch representing the first part of the signature.

2. The terminal then generates a random element a, to activate the generation of the second part of the signature s; this dispatch constitutes so to speak the sending of a challenge to the card for the verifier terminal, at the same time, acrtivates a timer to measure the response time of the card to this challenge.

The signature s that the card must send, given the checking formula f($r_i$, m, s, a)=$r_i$ which is provided for in the verifier is:

$$s=[xSHA(r_i) \bmod q+SHA(m, a)]/k_i \bmod q$$

This formula brings into action the coupon $r_i$, the secret x of the card, the message m sent, the number $k_i$, and the random element a sent by the verifier by way of a challenge. This formula is different from the one given by the DSA algorithm, s=(m+xr)/k, for several reasons: it must bring into action the random element to be sent by way of a challenge so that the verifier is sure that the timing computation of the signature s begins only when the random element a has reached the card. It is for this reason that a hashing of m and of the random element a, namely SHA(m, a), has been used instead of a hashing of m. Furthermore, preferably SHA($r_i$) is used rather than $r_i$ to use a coupon value in the form of a string that is longer than $r_i$ which is a very short string. This increases security. But naturally, if xSHA($r_i$) is used instead of x$r_i$ and SHA(m, a) is used instead of m, then the checking formula must take account thereof and it shall be seen further below that this is what is done. Other variants of signature computation can be provided for, on condition simply that the checking formula takes account of them.

3. The card computes the signature s as speedily as possible. However since, before the activation of the timer, it has already computed $A=x\text{SHA}(r_i) \bmod q$ and $I=1/k_i=\text{SHA}(x, J, i)$, all that remains for it to do is to compute:

$$s=I.(\text{SHA}(m, a)+A) \bmod q$$

This computation can be swift even for a simple, low-cost 8-bit microcontroller, for example of the Intel 8051 type or Motorola 6805 type. Once the computation is over, the card sends back the signature s.

4. Upon reception of s, the terminal stops the timer and performs the computations for checking the authenticity of the signature. If the signature has been accurately computed according to the above formula, then it can be verified that it is necessary to have the following equality:

$$[y^{(\text{SHA}(ri)/s) \bmod q} g^{(\text{SHA}(m,a)/s) \bmod q} \bmod p] = g^{ki} \bmod p$$

The verifier does not possess $k_i$. It possesses $r_i=H(g^{ki} \bmod p)$; H is the slowing-down and compression function.

The equality can therefore be converted into:

$$G[y^{(\text{SHA}(ri)/s) \bmod q} g^{(\text{SHA}(m,a)/s) \bmod q} \bmod p] = H(g^{ki} \bmod p) = r_i$$

The verifier has available $r_i$, s, a, p, g, m, a, the simple hash function SHA, and the slowing-down and compression function H. It therefore checks the above equality.

If the equality is obtained and if the signature has been sent within a period of time smaller than a determined threshold, the signature is accepted by the verifier. If one of the two conditions is not fulfilled, it is not accepted.

By way of an example for the assessment of the duration, it is possible to give the following indications: let T be the time needed to assess H(ch) on an extremely powerful computer, possibly even the most powerful computer known today. It may be assumed that the slowing-down function H, leading to strings with a length e (H also having a function of compression) is sufficiently complex and in any case must be chosen to be sufficiently complex so that, for any value z and any existing computer, the search for a new value ch' such that z=H(ch') requires a period of time $T.2^e$.

Given that someone who is unaware of the secret of the card can make a search for s only by trial and error on the basis of the checking formula (i.e. by making an exhaustive search), he cannot, even with a single attempt, find an accurate value of s if it is chosen to set the time threshold at a level very much smaller than this value $T.2^e$, for example a millionth of this value.

This gives an indication of the methodology to be followed to choose the slowing-down function H and the threshold duration.

In general, the principles explained here above and illustrated by an example can be applied to other signature protocols. In particular they can be applied to other protocols in which a precomputation of signature coupons is possible, especially the following protocols:
Rueppel-Nyberg
"New signature schemes based on the discrete logarithm problem", in proceedings of the Eurocrypt'94 conference.
Schnorr
"Efficient identification and signatures for smart cards", in proceedings of the Crypto'89 conference.
El-Gamal
"A public-key cryptosystem and a signature scheme based on discrete logarithms", in the journal *IEEE Transactions on Information Theory*, Vol. IT30, No. 4, pp. 469–472.
Guillou-Quisquater
"A practical zero-knowledge protocol fitted to security microprocessors minimizing both transmission and memory", in proceedings of the Eurocrypt'88 conference and "A paradoxical identity-based signature scheme resulting from zero-knowledge", in proceedings of the Crypto'88 conference.

Other public key systems based on the discrete logarithm, where the equation (m+xr)/k mod q is replaced by another equality bringing into action m, x, r and k (as explained in the article by Horster et al, "Meta message recovery and meta blind signature schemes based on the discrete logarithm problem and their applications", in proceedings of the Asiacrypt'94 conference), or again systems using several distinct random elements k or several distinct secrets x in the same signature.

The invention can be applied to the signing of electronic cheques and can then be used to make these cheques with low-cost smart cards (resulting from the use of an 8-bit microprocessor and a non-volatile memory of limited size).

Indeed, the message m may represent a transaction performed by the card with the terminal which is, for example, the payment terminal of a tradesman. This message m is signed. The terminal checks the signature in order to accept the message and hence the transaction, but this terminal is also connected to a central management authority (a bank for example) which must itself be capable of checking the message and the authenticity of the signature before debiting the signer's account on the one hand and/or crediting the tradesman's account on the other hand.

Thus, after having performed the entire procedure of signing and signature checking described in detail here above, the terminal sends the checking authority the electronic cheque $\{i, r_i, a, s, m\}$, and the authority ascertains that the signature s is the right signature, namely that:

$$s=\text{SHA}(x, J, i) [\text{SHA}(m, a)+x\text{SHA}(r_i)] \bmod q$$

and the authority credits the account of the terminal with the amount of the transaction defined in the message m.

It will be noted that, in the computation of the signature by the card, it is possible to use the expression SHA(m, i, a) instead of SHA(m, a). In this case, the formula of checking by the terminal should take account of it and should therefore be:

$$H[y^{(\text{SHA}(ri)/s) \bmod q} g^{(\text{SHA}(m,i,a)/s) \bmod q} \bmod p] = r_i$$

and the formula for the checking of signatures by the authority should also take account of it and be:

$$s=\text{SHA}(x, J, i)[\text{SHA}(m, i, a)+x\text{SHA}(r_i)] \bmod q$$

Figure 1:
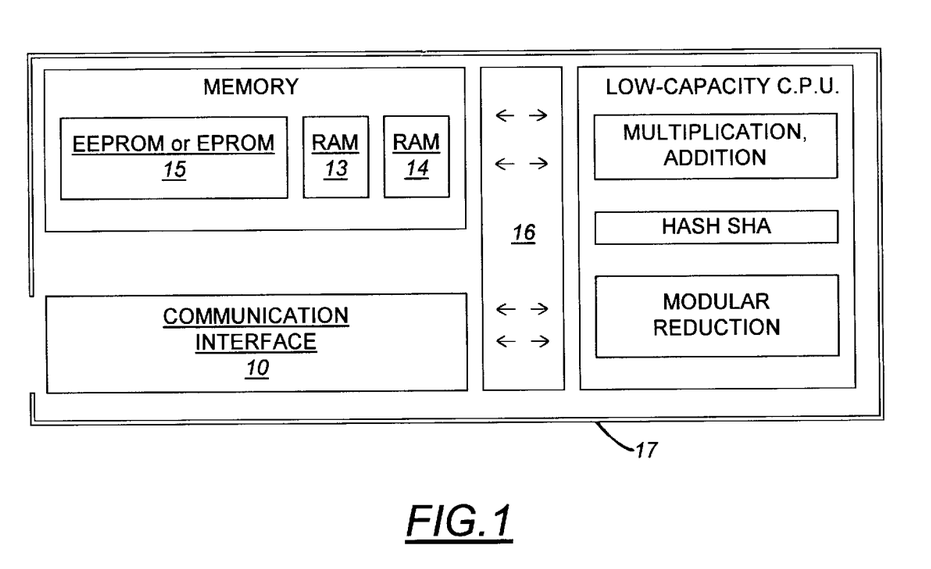
FIG. 1 describes the flow chart of a card implementing the system proposed by the present invention.
Figure 2:
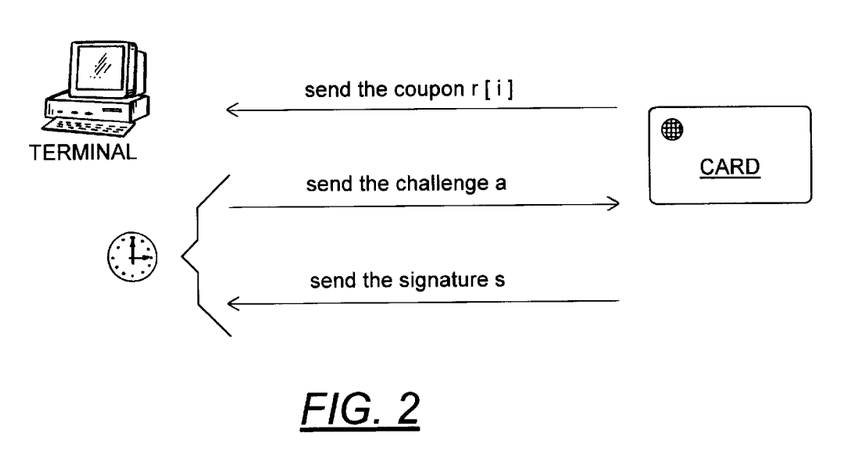
FIG. 2 describes the data elements transmitted between the card and the terminal at the time of the use of the coupon.

Referring to the figures, each smart card consists of a processing unit (CPU) 11, a communications interface 10, a random-access memory (RAM) 13 and/or a read-only memory (ROM) 14 and/or an erasable or electrically erasable and programmable read-only memory (EPROM or EEPROM) 15.

The processing unit 11 and/or the ROM 14 of the smart card contain computation programs or resources corresponding to the performance of the computation steps performed by the card during the loading of the coupons and during the signing of a message or the sending of an electronic cheque. These programs contain in particular the rules of computation for the generation of s and the rules of the use of the hash function SHA. The computation unit and the ROM programs also comprise the resources needed for the operations of multiplication, addition and modular reduction. Some of these operations can be combined (for example the modular reduction may be directly integrated into the multiplication).

Figure 4:
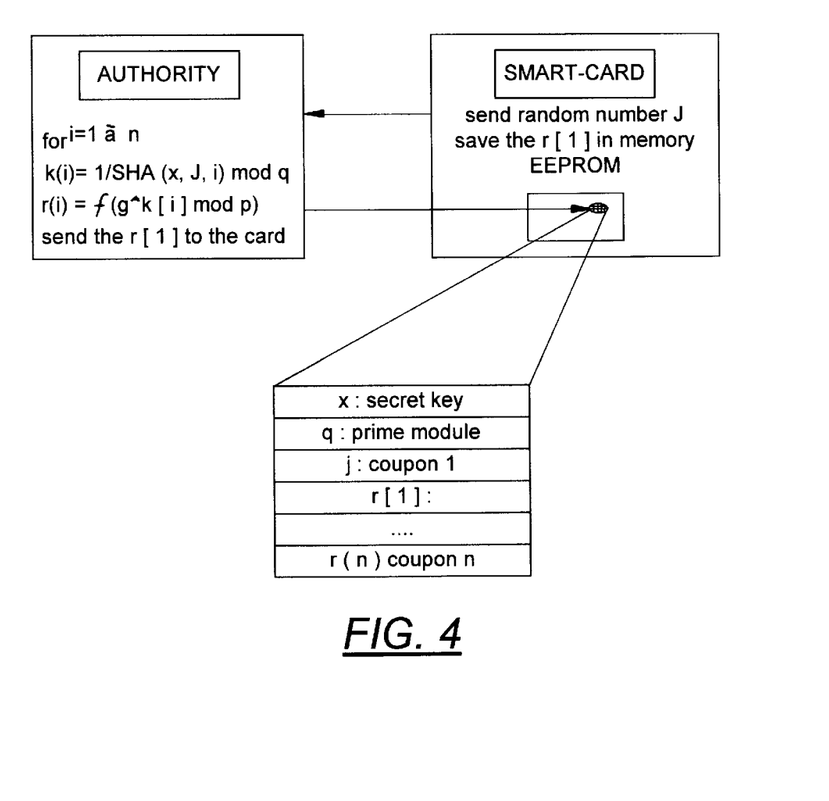
FIG. 4 shows the data elements transmitted between the card and the authority during the stage for the loading of the coupons and the organization of the memory of the card after the loading of n coupons.

Just as in the case of the DSA algorithm, the RAM of the card contains the message M and the random element a to which there are applied the hash function SHA(m, a) or SHA(m, i, a) for example. The non-volatile memory 15 typically contains the parameters q, x, J and the set of precomputed coupons ($r_i$). The index is in a non-volatile counter incremented at each new generation of a signature and reset during the loading of coupons.

The processing unit of the card, through address and data buses 16 and the communications interface 10, activates the operations of reading and writing in the memory 13, 14 and 15.

Each smart card is protected from the exterior by physical protection systems 17. These protection systems ought to be sufficient to prevent any unauthorized entity from obtaining the secret key x. The techniques most commonly used at the present time in this field are the integration of the chip into a safety module and the fitting out of the chips with devices capable of detecting variations in temperature, light as well as abnormal voltages and clock frequencies. Special designing techniques such as the scrambling of the memory access are also used.

Figure 3:
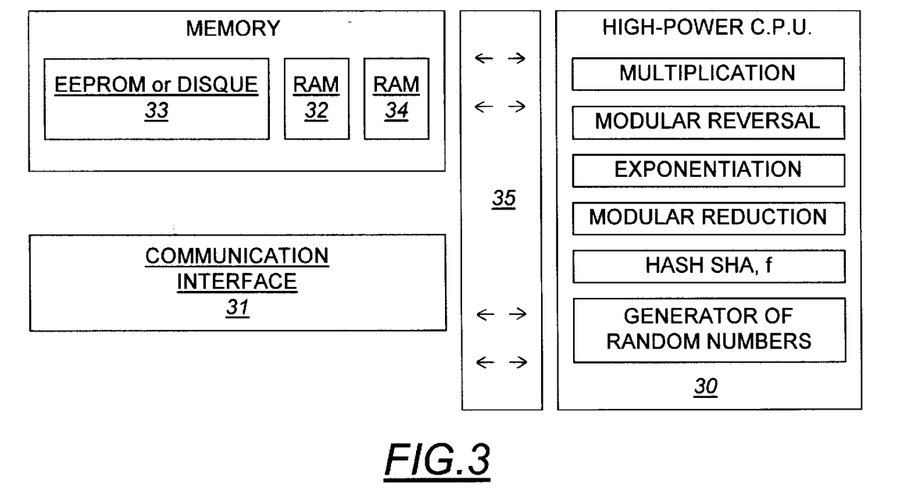
FIG. 3 describes the flow chart of a terminal implementing the system proposed by the present invention.

The terminal for its part consists of a minimum of one processing unit (CPU) 30 and memory resources 32, 33, 34.

The CPU 30, through the address and data buses 35 and the communications interface 31, controls the operations of reading and writing in the memories 32, 33, 34.

The CPU 30 and/or the ROM 34 of the authority contain computation programs or resources enabling the implementation of the rules of computation and of the hash, slowing-down and compression, multiplication, addition, modular inversion, exponentiation and modular reduction functions needed for the computation of the coupons and for the checking of signatures. Certain of these operations (for example the multiplication and modular reduction operations) may be combined.

The entire invention has been described with reference to smart cards, but it will be understood that it can be applied when the signer unit is another object and especially when it is a portable object such as a PCMCIA card which is a type of smart card with parallel and non-serial transmission protocols or a badge, contact-free card, etc. The communication may be between the card and the terminal, either directly by means of electronic signatures or by remote, radiofrequency or infrared transmission.

What is claimed is:

1. An electronic signature method, comprising:
   (A) generating a digital signature, the digital signature being capable of certifying the integrity of a signed message and the identity of a signer unit which signs the signed message, the generating step being performed by the signer unit, and the generating step including computing the signature using the signed message and a random data element sent to the signer unit by a verifier unit, and
   (B) checking the signature, the checking step being performed by the verifier unit, and the checking step including
      (1) ascertaining that a mathematical condition which uses the signature sent and the random data element is fulfilled, and
      (2) timing the period that elapses between an instant when the random data element is sent by the verifier unit to the signer unit and the instant when the signature using this data element returns to the verifier unit after computation by the signer unit, and wherein the signature is accepted if the time elapsed is below a defined threshold and if the mathematical condition is fulfilled.

2. A method according to claim 1,
   wherein the computing step and the checking step are performed on the basis of an algorithm of the type in which the signature generation produces two values {r, s}, s being computed from r and a secret key x, and in which the checking of the signature {r, s} consists of the checking of an equality v=f(r, s)=r between r and a function f of r and of s, and
   wherein the function f is chosen to be sufficiently complex so that the period of search for a value s on the basis of the equality when there is no knowledge of the secret key is far greater, even if it is performed by a powerful computer, than the period of computation and transmission by the signer unit of the value s on the basis of r and of the secret key, this being the case even if the signer unit uses a low-power microprocessor.

3. A method according to claim 2, wherein the function f(r, s) also uses the message to be signed.

4. A method according to claim 2, wherein the function f comprises mathematical computations followed by a complex hash function H achieving both a slowing down of the obtaining of a computation result and a compression of length of the computation result.

5. A method according to claim 4, wherein the first signature value r is established by other mathematical computations, followed by the same complex hash function H.

6. A method according to claim 1,
   wherein the signature sent by the signer comprises at least one signature coupon $r_i$ and one signature complement s that is computed on the basis of the signature coupon $r_i$ and of a secret key x of the signer unit,
   wherein the checking step includes using a checking formula of the type v=f($r_i$, s)=$r_i$;
   and wherein
      a. the signature coupon is established in advance by a certified authority, in two steps:
         i) the computation of a number represented by a long binary string, using a mathematical formula which uses big binary numbers, and
         ii) the modification of the result of the computation by a complex compression function greatly reducing the length of this result,
      b. a series of different signature coupons of small length are thus prepared in advance and stored in the signer unit,
      c. the generating step comprises sending a signature coupon $r_i$ and a signature complement s computed on the basis of at least $r_i$ and x to the verifier unit,
      d. the checking step comprises performing a mathematical computation followed by the same complex compression function as the one used to prepare the signature coupon, and comparing the result with the signature coupon for the signature checking.

7. An electronic signature method, comprising:
   (A) generating a digital signature, the digital signature being capable of certifying the integrity of a signed message and the identify of a signer unit which signs the signed message, the generating step being performed by the signer unit, and the generating step including computing the signature using the signed message, and
   (B) checking the signature, the checking step being performed by the verifier unit, and the checking step including ascertaining that a mathematical condition which takes into account the signature sent is fulfilled, the signature being accepted if the mathematical condition is fulfilled;

wherein the signature sent by the signer unit comprises at least one signature coupon $r_i$ and one signature complement s that is computed on the basis of the signature coupon $r_i$ and of a secret key x of the signer unit, wherein the checking step includes using a checking formula of the type $v=f(r_i, s)=r_i$;

and wherein a. the signature coupon is established in advance by a certified authority, in two steps:
  i) the computation of a number represented by a long binary string, using a mathematical formula which uses big binary numbers,
  ii) and the modification of the result of the computation by a complex compression function greatly reducing the length of this result, b. a series of different signature coupons of small length are thus prepared in advance and stored in the signer unit, c. the generation step comprises sending a signature coupon $r_i$ and a signature complement s computed on the basis of at least $r_i$ and x to the verifier unit, d. the checking step comprises performing a mathematical computation followed by the same complex compression function as the one used to prepare the signature coupon, and comparing the result with the signature coupon for the signature checking.

8. A method according to claim 7, wherein the compression function is a complex hash function.

9. A method according to claim 7, wherein the computation of the coupon is performed on the basis of a random element J generated at the outset by the signer unit and stored in the signer unit to be reused when the coupon is used to establish a signature.

10. A method according to claim 7, further comprising the following steps, which are performed by the verifier unit:

(a) sending a random element a to the signer unit, (b) activating a timer, the timer being activated approximately when the verifier unit sends the random element a to the signer unit, (c) measuring the time taken by the signer unit to send back the signature complement s computed on the basis of at least the random element a and the secret key x of the signer unit;

(d) carrying out a signature checking computation on the basis of at least the signature s and the random element a, and (e) accepting the signature if the signature checking computation determines that a predetermined condition is fulfilled and if the time taken by the signer unit to send back the signature s using the random element is below a predetermined threshold.

11. A method according to claim 7, wherein the signature complement s is established on the basis of a hash function SHA(m, a) of a message to be signed and of this random element a, and in that the same hash function is used for the signature checking.

12. A method according to claim 7, wherein the signature complement s is established by a computation which uses a random element J stored in the signer unit and having been used to establish the signature coupon.

13. A method according to claim 12, wherein the computation uses the random element J stored in the signer unit also brings into play a hash function SHA(x, J, i) pertaining at least to this random element J and to index i representing the number of the coupon used, this same hash function SHA (x, J, i) having been used previously during the computation of the long binary string provided for in the computation of the corresponding coupon.

14. A method according to claim 7, wherein the signature complement s is established by a computation which uses a hash function, the same hash function of the coupon being used for the signature checking.

15. A method according to claim 1, wherein the digital signature is computed according to the DSA algorithm.

16. A method according to claim 1, wherein the signer unit is a smart card, such that the generating step is performed by the smart card.

17. A method according to claim 1, wherein the computing step and the checking step are performed on the basis of an algorithm of the type in which the signature generation produces two values {r, s}, s being computed from r and a secret key x, and in which the checking of the signature {r, s} consists of the checking of an equality $v=f(r, s)=r$ between r and a function f of r and of s, wherein, during the computing step, the value s is computed, and wherein the value r is provided to the signer unit prior to the computing step in the form of a signature coupon.

18. A method for the generation of digital signatures of messages by a signer unit and for the checking of these signatures by a verifier unit, the signer unit comprising a device that computes, communicates and retains data elements, the device comprising at least one electrically programmable non-volatile memory, according to which there are prepared enciphered data elements constituting signature coupons that are loaded into the non-volatile memory and that are used by the signer unit to sign messages, chiefly characterized in that:

the coupons are compressed by the application of a compression function H, also called a hash function, by a certified authority before being loaded into the memory, and in that this method comprises the following exchanges:

a message m is transmitted and this message must be certified by a signature, the signer unit sends a coupon $r_i$ to the verifier unit, the verifier unit sends a random number a to the signer unit and activates a timer, the signer unit computes the signature s of the message and sends it to the verifier unit, the verifier unit stops the timer and ascertains that the signature has been obtained through the secret key held in the signer unit and the coupon $r_i$ received, this checking is done by checking the equality $v=f(r_i, s, m)=r_i$;

the verifier unit accepts the signature if the condition of checking $v=r_i$ is fulfilled and if the measured time does not exceed an allocated predetermined period.

19. An electronic signature method comprising:

(A) computing a plurality of signature coupons, each of the plurality of signature coupons being computed on the basis of a number which is regenerated for each new signature and on the basis of known parameters of the signature algorithm;

(B) providing the chip card with the plurality of signature coupons;

(C) generating a digital signature, the digital signature being capable of certifying the integrity of a signed message and the identity of a chip card which operates as a signer unit and which signs the signed message, and the generating step including computing the signature using the signed message, a random data element sent to the chip card by a verifier unit, a secret key, and one of the plurality of signature coupons, and (D) checking the signature, the checking step being performed by the verifier unit, and the checking step including
   (1) ascertaining that a mathematical condition which uses the signature sent and the random data element is fulfilled, and
   (2) timing the period that elapses between an instant when the random data element is sent by the verifier unit to the chip card and the instant when the signature using this data element returns to the verifier unit after computation by the chip card, and wherein the signature is accepted if the time elapsed is below a defined threshold and if the mathematical condition is fulfilled.

20. A method according to claim 19,
wherein the computing step and the checking step are performed on the basis of an algorithm of the type in which the signature generation produces two values $\{r, s\}$, s being computed from r and a secret key x, and in which the checking of the signature $\{r, s\}$ consists of the checking of an equality $v=f(r, s)=r$ between r and a function f of r and of s,
wherein, during the computing step, the value s is computed,
wherein the value r is one of the plurality of coupons, and
wherein the function f is chosen to be sufficiently complex so that the period of search for a value s on the basis of the equality when there is no knowledge of the secret key is far greater, even if it is performed by a powerful computer, than the period of computation and transmission by the signer unit of the value s on the basis of r and of the secret key, this being the case even if the signer unit uses a low-power microprocessor.

* * * * *